3,333,269
SATELLITE ANTENNA PATTERN STABILIZATION
METHOD AND APPARATUS
Friedrich Vilbig, Munich-Solln, Germany, assignor to Bolkow Gesellschaft mit beschrankter Haftung, Ottobrunn, near Munich, Germany
Filed Apr. 1, 1965, Ser. No. 444,646
Claims priority, application Germany, Apr. 3, 1964,
B 76,169
15 Claims. (Cl. 343—100)

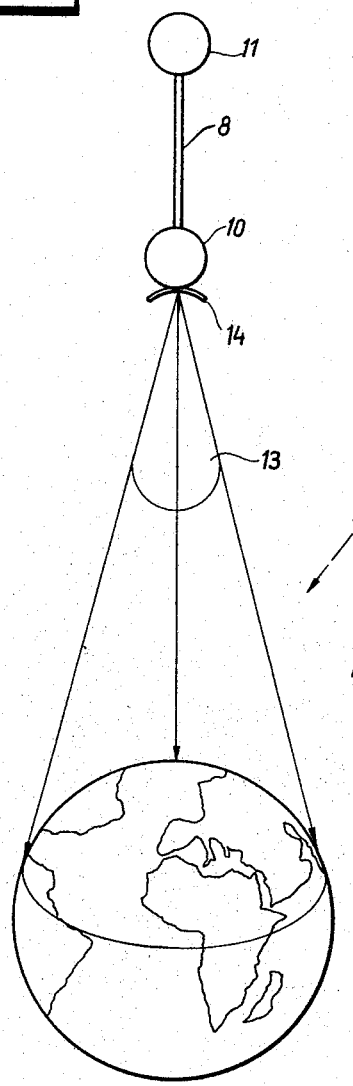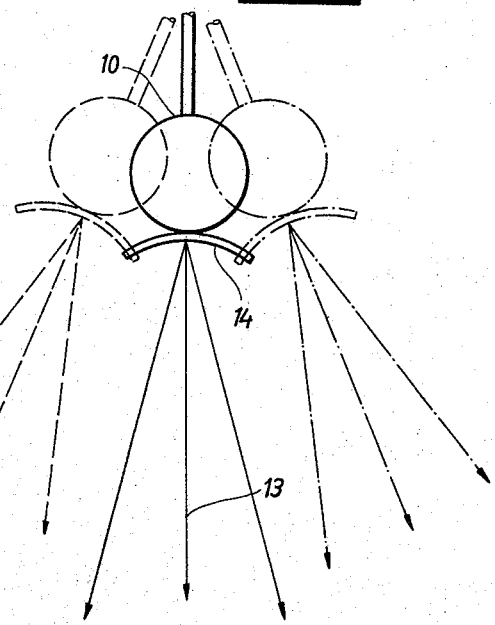

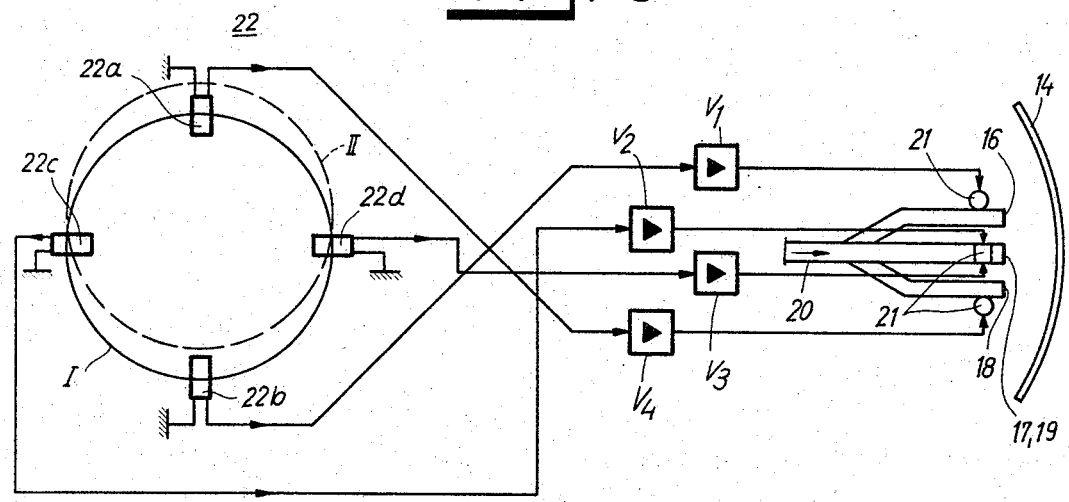
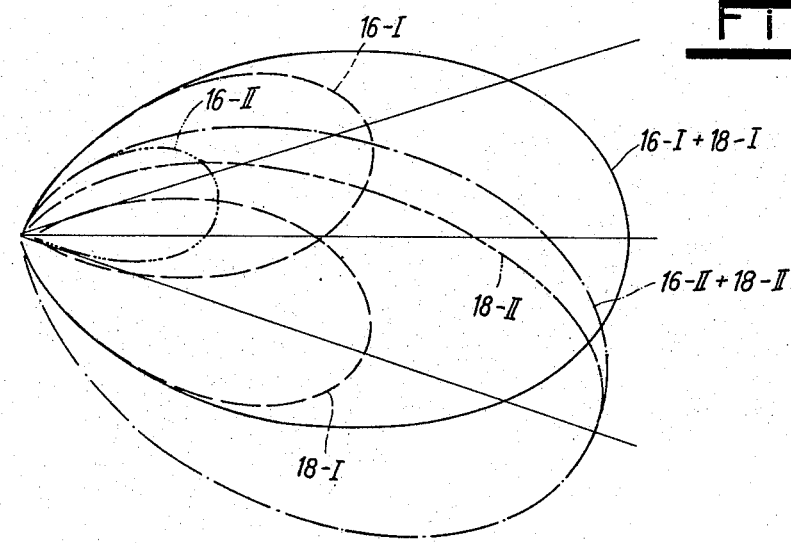

This invention relates to communication satellites having directional antennas and, more particularly, to a novel method of and apparatus for altering the radiation pattern of a directional antenna fixedly mounted on a satellite to maintain the direction of maximum radiation directed toward an earth-bound receiving station irrespective of angular deviations of the axis of the satellite from a predetermined normal orientation.

The invention is particularly directed to a satellite which has the form or configuration of a dumbbell, as contrasted to the usual and well known drum-shaped satellites. A communication satellite in the form of a dumbbell is particularly suitable where the source of power is an atomic energy reactor or other form of atomic energy. In such case, and as it is not practical to resort to the usual shielding expedients, the power plant must be arranged far enough away from the physical and electrical instruments of the satellite that the latter cannot be harmed by radiation.

Instead of the spin stabilization used with drum-shape satellites, position control of satellites of the dumbbell-shape type is effected by earth gravitation-gradient control means. The control forces for turning the satellite into the position in which it is to be stabilized are produced by auxiliary power plants on the satellite. However, due to the low directional force of the earth gravitation-gradient effect oscillations of the satellite during its revolution about the earth cannot be avoided. Such oscillations may be caused by, inter alia, gravitational influences of the sun and the moon, variations in the gravitational field of the earth, variations in light pressure during revolution of the satellite, meteor impacts, etc. Due to the relatively low directional effects of the earth gravitation-gradient, the periods of these oscillations are relatively long.

The directional antenna of such a satellite, which is fixed or immovably secured to the satellite, is so oriented with respect to the stabilization axis of the satellite that the direction of maximum radiation of the radiation pattern of the antenna is directed toward a selected earth-bound receiving station. Consequently, when the satellite oscillates about its axis, there are very large fluctuations in the energy received by the earth-bound receiving station.

An object of the present invention is to provide a method for altering the radiation pattern of a directional antenna, fixedly positioned on a satellite, to change the direction of maximum radiation of such pattern to compensate for deviations in the orientation of the stabilization axis of the satellite.

Another object of the invention is to provide a communication satellite with a fixedly positioned directional antenna whose direction of maximum radiation is aligned with a selected earth-bound receiving station, and with means to alter the directional pattern of said antenna responsive to deviations of the satellite stabilization axis from a normal position to maintain the maximum radiation direction directed toward said selected receiving station.

A further object of the invention is to provide a communication satellite having the configuration of a dumbbell, comprising two spaced bodies fixedly interconnected by a relatively elongated rectilinear member and having an axis extending longitudinally of the dumbbell, this dumbbell configuration satellite having a directional antenna fixedly secured on one of the bodies and having a radiation pattern in which the direction of maximum radiation is directed toward a selected earth-bound receiving station, and further including means operable, responsive to deviation of the satellite longitudinal axis from a normal orientation directed toward the center of the earth, to alter such radiation pattern to maintain its maximum radiation direction directed toward said selected earth-bound receiving station.

Yet another object of the invention is to provide a communication satellite having a directional antenna and including means operable to alter the radiation pattern of said antenna responsive to angular deviations of the antenna and in a direction to maintain the direction of maximum radiation oriented in a selected direction.

Still another object of the invention is to provide a method of maintaining the direction of maximum radiation of the radiation pattern of a directional antenna oriented in a selected direction by altering the radiation pattern responsive to deviations of the antenna from a predetermined angular orientation.

A further object of the invention is to provide, in a communication satellite provided with a fixedly positioned directional antenna, electronic switching means operable, responsive to angular deviation of the satellite axis from a predetermined orientation, to alter the radiation pattern of said antenna to maintain the direction of maximum radiation directed in a particular direction.

Still a further object of the invention is to provide a dumbbell configuration communication satellite including a parabolic directional antenna rigidly connected therewith and having at least four horn radiators arranged symmetrically with respect to the focal point of the mirror and having discharge gaps provided therein for regulating the intensity of the radiation output, and further including multi-vibrators controlling these discharge gaps and operating in dependence upon directional voltages produced by sensor means determining the deviation of the satellite axis from the direction of the earth's center.

For an understanding of the principles of the invention, reference is made to the following description of a typical embodiment thereof as illustrated in the accompanying drawings.

In the drawings:

FIG. 1 is a schematic representation of a communications satellite embodying the invention, illustrated in relation to the earth;

FIG. 2 is a partial schematic view, corresponding to FIG. 1, and illustrating the oscillation of the satellite due to influences effective in outer space;

FIG. 3 is a schematic wiring diagram illustrating the radiation pattern altering means of the invention; and FIG. 4 is a diagrammatic illustration of the radiation pattern of a parabolic antenna, further illustrating the altering of the pattern to change the direction of maximum radiation.

Referring to FIG. 1, a dumbbell configuration satellite embodying the invention is illustrated as divided into two masses or bodies which are rigidly interconnected, in spaced relation with each other, by means of a relatively elongated and rectilinear member 8. One of these masses comprises a capsule 10 which contains the instruments and the electrical devices, and the other of the masses is indicated as a capsule 11 which contains a current or power supply plant fueled with atomic energy. The axis of the satellite may be considered to extend centrally along the member 8 and, in the normal stabilized position of the satellite, this axis is directed toward the center of the earth. However, and as mentioned above, various influences such as gravity effects due to the gravitation fields of the sun and the moon, variations in the gravitational field of the earth, variations in light pressure, meteor impacts, and the like will cause the axis to deviate from a direction in which it intersects the center of the earth, or to oscillate about its stabilized position, with the periods of the oscillations being relatively long because of the low directional effect of the earth gravitation-gradient.

A parabolic directional antenna 14 is fixedly secured to the capsule 10, and has a radiation pattern 13. Due to the mentioned oscillation of the satellite, the directional pattern 13 of antenna 14 will likewise oscillate, resulting in very large fluctuations in the reception of transmitted radiation at a selected earth-bound receiving station and to which the pattern 13 normally has its direction of maximum radiation directed. The oscillations of the satellite, together with the change in the angular direction of the radiation pattern 13 of antenna 14, are diagrammatically represented in FIG. 2.

In accordance with the invention, the maximum radiation direction of the radiation pattern 13 of antenna 14 is shifted in a manner to compensate the shifting of the axis of the satellite during the mentioned oscillations. This is effected by altering the radiation pattern 13 in accordance with the degree and direction of the oscillation of the satellite. The altering of the radiation pattern is effected by means of directional voltages produced by sensors which determine the deviation of the satellite axis from a direction intersecting the center of the earth, and is effected by known switching means.

In a preferred embodiment of the invention illustrated in the drawings, antenna 14 is a parabolic antenna which is rigidly connected with the body or capsule 10 of the satellite and has four horn radiators arranged symmetrically with respect to the focal axis of the parabolic antenna. Discharge gaps are provided in these horn radiators, whereby the intensity of the individual radiation outputs may be regulated, and multi-vibrators are provided for controlling the discharge gaps and these multi-vibrators are controlled by directional voltages. Due to the rigid connection of antenna 14 to the satellite, there is absolutely no mass displacement inside the satellite with the effect that the resulting reactions on the position-stability of the entire satellite are avoided.

FIG. 3 shows schematically one arrangement for electronic shifting or alteration of the directional radiation pattern or parabolic antenna 14. Four horn radiators 16, 17, 18 and 19 are positioned symmetrically with respect to the focal axis of mirror antenna 14. These radiators 16–19 are commonly fed through a tubular transmitting conductor or wave guide 20 provided with matching diaphragms. Each horn radiator has a discharge gap 21 for regulating the radiation efficiency, and the discharge gaps are controlled by multi-vibrators controlled, as to operation, by directional voltages produced by sensors in association with suitable known switching means, these sensors detecting the deviation of the satellite axis from the direction of the center of the earth.

The sensor means could be, for example, a gyro-compass or infra-red sensors. An infra-red sensor means is indicated at 22, in FIG. 3, as including four photo-electric cells 22a–22d, each operatively connected to a respective one of the four horn radiators 16–19. These photo cells are so designed as to be sensitive to infra-red energy. Sensors 22a–22d are arranged to observe the visible earth calotte, which appears as a disk-shaped radiator of infra-red energy. The positioning arrangement is such that, when the satellite is correctly oriented with its axis intersecting the center of the earth, the disk I intersects exactly one-half of each of the four sensors 22a–22d. In this position, all four of the sensors furnish the same output voltages, and these output voltages are amplified in amplifiers V1–V4 and the amplified voltages are applied as mean bias voltages to the beam regulating discharge gaps 21 associated with the respective horn radiators.

Each horn radiator 16–19 is connected to a respective sensor 22a–22d, as schematically illustrated in FIG. 3. Thus, sensor or photo-electric cell 22a supplies the control voltage for horn radiator 18, sensor 22b supplies the control voltage for horn radiator 16, sensor 22c provides the control voltage for horn radiator 17 and sensor 22d supplies the control voltage for horn radiator 19. With proper orientation of the satellite, horn radiators 16 and 18 thus provide equal radiation patterns 16–I and 18–I, as shown in FIG. 4, but differing in their direction. This provides the resulting radiation pattern 16–I+18–I whose direction and the direction of whose maximum intensity of radiation, coincides with the orientation of the satellite.

When the satellite changes its position or orientation so that the reproduced infra-red disk moves into the position II of FIG. 3, photo-electric cell 22a provides a higher output voltage since more radiation reaches this cell, whereas the opposing photo-electric cell 22b supplies a lower output voltage as little or no radiation will reach this cell. Due to the resulting variation of the respective bias voltages, the radiation 16–II of horn radiator 16 diminishes, as shown in FIG. 4, while the radiation pattern 18–II of horn radiator 18 increases. The resulting radiation pattern 16–II+18–II is thus changed in an opposite direction with respect to the change of position or orientation of the satellite. Thus, the direction of maximum radiation is maintained at a fixed orientation with respect to a selected earth-bound receiving station irrespective of oscillations of the axis of the satellite.

The radiation efficiency of the horn radiators can be regulated in other ways, for example, capacitatively by phase control, and in other manners. If all four horn radiators radiate uniformly, the directional axis of the antenna pattern coincides with the axis of the parabolic mirror antenna 14 but if the horn radiators 16–19 are arranged in opposed pairs, for example, the directional beam will turn correspondingly upwardly or downwardly or to one or the other of two sides. Thus, the directional beam can thus be deflected in any direction by controlling the intensity of the radiation efficiency of the four horn radiators. In other words, the directional pattern is angularly adjustable through a solid angle.

While a specific embodiment of the invention has been shown and described in order to illustrate the application of the principles of the invention, it will be understood that the invention may be embodied otherwise without departing from such principles.

What is claimed is:

1. A communication satellite having an axis of stabilization and normally constrained to an orientation in which said axis is directed to the earth's center, said satellite being subjected to influences temporarily deviating its axis from its normal direction; a directional antenna fixedly positioned on said satellite and having a radiation pattern whose maximum radiation direction is directed toward an earth-bound receiving station; and means operable, responsive to deviation of said satellite axis from its normal direction, to alter said radiation pattern in a compensating manner to maintain its maximum radiation direction directed toward said receiving station.

2. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a directional antenna fixedly positioned on said satellite and having a radiation pattern whose maximum radiation direction is directed toward an earth-bound receiving station; and means operable, responsive to deviation of said satellite axis from its normal direction, to alter said radiation pattern in a compensating manner to maintain its maximum radiation direction directed toward said receiving station.

3. The method of maintaining the direction of radiation from a communication satellite constantly directed toward a selected earth-bound receiving station, the communication satellite having an axis of stabilization and being normally constrained to an orientation in which said axis is directed to the earth's center, and said satellite being subjected to influences temporarily deviating its axis from its normal direction; said method comprising the steps of fixedly positioning, on said satellite, a directional antenna having a radiation pattern whose maximum radiation direction is directed toward the earth-bound receiving station; and, responsive to deviation of the satellite axis from its normal direction, altering said radiation pattern in a compensating manner to maintain its maximum radiation direction directed toward the receiving station.

4. The method of maintaining the radiation from a communication satellite, having the shape of a dumbbell, constantly directed toward a selected earth-bound receiving station, the communications satellite including an axis extending longitudinally of the dumbbell and normally constrained to an orientation in which said axis is directed to the earth's center, and said satellite being subjected to influences temporarily deviating its axis from its normal direction: said method comprising the steps of fixedly positioning, on said satellite, a directional antenna having a radiation pattern whose maximum radiation direction is directed toward the earth-bound receiving station; and responsive to deviation of said satellite axis from its normal direction, altering said radiation pattern in a compensating manner to maintain its maximum radiation direction directed toward the receiving station.

5. The method of maintaining the radiation from a communication satellite, having the shape of a dumbbell, constantly directed toward a selected earth-bound receiving station, the communications satellite including an axis extending longitudinally of the dumbbell and normally constrained to an orientation in which said axis is directed to the earth's center, and said satellite being subjected to influences temporarily deviating its axis from its normal direction: said method comprising the steps of fixedly positioning, on said satellite, a directional antenna having a radiation pattern whose maximum radiation direction is directed toward the earth-bound receiving station; observing, on the satellite, the visible earth callote appearing as a disk-shaped radiator occupying a predetermined position when the satellite axis is directed to the earth's center, and shifing from such predetermined position upon deviation of the satellite axis from its normal direction; and, responsive to shifting of said disk-shaped radiator from its predetermined position, altering the radiation pattern of said antenna in a compensating manner to maintain its maximum radiation direction directed toward the receiving station.

6. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a directional antenna fixedly positioned on said satellite and having a radiation pattern whose maximum radiation direction is directed toward an earth-bound receiving station; sensing means operable to provide control signals responsive to deviations of the satellite axis from its normal direction; and switching means connected to said sensing means and operable by said control signals to alter said radiation pattern in a compensating manner to maintain its maximum radiation direction directed toward said receiving station.

7. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a directional antenna fixedly positioned on said satellite and having a radiation pattern whose maximum radiation direction is directed toward an earth-bound receiving station; sensing means operable to sense deviations of said satellite axis from its normal direction, said sensing means providing control signals corresponding to the direction and extent of such deviation; and switching means connected to said sensing means and operable by said control signals to alter said radiation pattern in a compensating manner to maintain its maximum radiation direction directed toward said receiving station.

8. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a directional antenna fixedly positioned on said satellite and having a radiation pattern divided into four equal quadrants and whose maximum radiation direction is directed toward an earth-bound receiving station; four sensing means arranged in quadrature to sense the direction and extent of deviation of the satellite axis from its normal direction, each sensing means being operatively associated with a respective quadrant of said radiation pattern; said sensing means providing control signals corresponding to the direction and extent of deviation of the satellite axis from its normal direction; and plural switching means, each associated with a respective sensing means, and operable by said control signals to alter the radiation intensity in the respective quadrants of said radiation pattern in a compensating manner to maintain the maximum radiation direction of said radiation pattern directed toward said receiving station.

9. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a directional antenna fixedly positioned on said satellite and having a radiation pattern divided into four equal quadrants and whose maximum radiation direction is directed toward an earth-bound receiving station; four sensing means arranged in quadrature to sense the direction and extent of deviation of the satellite axis from its normal direction, each sensing means being operatively associated with a respective quadrant of said radiation pattern; said sensing means providing control signals corresponding to the direction and extent of deviation of the satellite axis from its normal direction; and plural switching means, each operatively associated with a respective sensing means, and operable by said control signals to alter the distribution of radiation intensity among said four quadrants in a compensating manner to maintain the maximum radiation direction of said radiation pattern directed toward said receiving station.

10. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a parabolic directional antenna fixedly positioned on said satellite and having a radiation pattern whose maximum radiation direction is directed toward an earth-bound receiving station; at least four horn radiators arranged symmetrically with respect to the focal axis of said parabolic antenna; sensing means, equal in number to said horn radiators, and each associated with a respective horn radiator, operable to detect deviation of said satellite axis from its normal direction, and providing control signals corresponding to the direction and extent of such deviation; and plural switching means, each associated with a respective sensing means and its associated horn radiator and operable by said control signals to alter the distribution of the intensity of radiation between said horn radiators in a compensating manner to maintain the maximum radiation direction of said radiation pattern directed toward said receiving station.

11. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a parabolic directional antenna fixedly positioned on said satellite and having a radiation pattern whose maximum radiation direction is directed toward an earth-bound receiving station; at least four horn radiators arranged symmetrically with respect to the focal axis of said parabolic antenna; sensing means, equal in number to said horn radiators, and each associated with a respective horn radiator, operable to detect deviation of said satellite axis from its normal direction, and providing control signals corresponding to the direction and extent of such deviation; and plural switching means, each associated with a respective sensing means and its associated horn radiator and operable by said control signals to alter the distribution of the intensity of radiation between said horn radiators in a compensating manner to maintain the maximum radiation direction of said radiation pattern directed toward said receiving station; each of said horn radiators having a discharge gap for regulating its radiation efficiency, and said switching means controlling the respective discharge gaps.

12. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a parabolic directional antenna fixedly positioned on said satellite and having a radiation pattern whose maximum radiation direction is directed toward an earth-bound receiving station; at least four horn radiators arranged symmetrically with respect to the focal axis of said parabolic antenna; sensing means, equal in number of said horn radiators, and each associated with a respective horn radiator, operable to detect deviation of said satellite axis from its normal direction, and providing control signals corresponding to the direction and extent of such deviation; and plural switching means, each associated with a respective sensing means and its associated horn radiator and operable by said control signals to alter the distribution of the intensity of radiation between said horn radiators in a compensating manner to maintain the maximum radiation direction of said radiation pattern directed toward said receiving station; each of said horn radiators having a discharge gap for regulating its radiation efficiency, and said switching means controlling the respective discharge gaps; said switching means comprising multi-vibrators.

13. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a parabolic directional antenna fixedly positioned on said satellite and having a radiation pattern whose maximum radiation direction is directed toward an earth-bound receiving station; at least four horn radiators arranged symmetrically with respect to the focal axis of said parabolic antenna; infra-red responsive sensing means corresponding in number and location to said horn radiators and each operatively associated with a respective horn radiator; said infra-red responsive sensing means being arranged to observe the position of a disk radiator of infra-red energy comprising the earth's calotte as viewed from said satellite, and said sensing means being so positioned that, when said satellite axis intersects the earth's center, said sensing means receive equal amounts of infra-red energy from said disk; said sensing means providing respective control signals corresponding to the direction and degree of deviation of said satellite axis from its normal direction; and plural switching means, each associated with a respective sensing means, and operable by the control signals thereof to alter the distribution of the radiation intensity among said horn radiators in a compensating manner to maintain the maximum radiation direction of said radiation pattern directed towoard said receiving station.

14. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a parabolic directional antenna fixedly positioned on said satellite and having a radiation pattern whose maximum radiation direction is directed toward an earth-bound receiving station; at least four horn radiators arranged symmetrically with respect to the focal axis of said parabolic antenna; infra-red responsive sensing means corresponding in number and location to said horn radiators and each operatively associated with a respective horn radiator; said infra-red responsive sensing means being arranged to observe the position of a disk radiator of infra-red energy comprising the earth's calotte as viewed from said satellite, and said sensing means being so positioned that, when said satellite axis intersects the earth's center, said sensing means receive equal amounts of infra-red energy from said disk; said sensing means providing respective control signals corresponding to the direction and degree of deviation of said satellite axis from its normal direction; and plural switching means, each associated with a respective sensing means, and operable by the control signals thereof to alter the distribution of the radiation intensity among said horn radiators in a compensating manner to maintain the maximum radiation direction of said radiation pattern directed toward said receiving station; each of said horn radiators having a discharge gap for regulating its radiation efficiency, and said switching means controlling the respective discharge gaps.

15. A communication satellite having the shape of a dumbbell and including an axis extending longitudinally of the dumbbell, said satellite being normally constrained to an orientation in which said axis is directed to the earth's center, and being subjected to influences temporarily deviating its axis from its normal direction; a parabolic directional antenna fixedly positioned on said satellite and having a radiation pattern whose maximum radiation direction is directed toward an earth-bound receiving station; at least four horn radiators arranged symmetrically with respect to the focal axis of said parabolic antenna; infra-red responsive sensing means corresponding in number and location to said horn radiators and each operatively associated with a respective horn radiator; said infra-red responsive sensing means being arranged to observe the position of a disk radiator of infra-red energy comprising the earth's calotte as viewed from said satellite, and said sensing means being so positioned that, when said satellite axis intersects the earth's center, said sensing means receive equal amounts of infra-red energy from said disk; said sensing means providing respective control signals corresponding to the direction and degree of deviation of said satellite axis from its normal direction; and plural switching means, each associated with a respective sensing means, and operable by the control signals thereof to alter the distribution of the radiation intensity among said horn radiators in a compensating manner to maintain the maximum radiation direction of said radiation pattern directed toward said receiving station; each of said horn radiators having a discharge gap for regulating its radiation efficiency, and said switching means controlling the respective discharge gaps; said switching means comprising multi-vibrators.

No references cited.

RODNEY D. BENNETT, *Primary Examiner.*

CHESTER L. JUSTUS, *Examiner.*

D. C. KAUFMAN, *Assistant Examiner.*